United States Patent Office 3,339,058
Patented Aug. 29, 1967

3,339,058
METHOD OF PRIMING AND WELDING STEEL
Judson P. Todd, 943 16th E., Seattle, Wash. 98102
No Drawing. Filed Aug. 12, 1965, Ser. No. 479,347
15 Claims. (Cl. 219—137)

ABSTRACT OF THE DISCLOSURE

Welding process and welded article involving pre-application of a weldable primer composition to particle-blasted steel plate and the like. The primer composition is composed of a resin, aluminum powder and solvent-diluent mixture, applied by spraying to a thickness of less than about 2 mils, the resin constituent of the primer being selected from the group consisting of polyvinyl butyral resin, uncatalyzed epoxy resin, hydrocarbon resin, and mixtures thereof, the aluminum powder constituent having a particle size predominantly less than about 325 mesh and being present in a ratio of from about 1:40 to about 1:1 by weight relative to the resin constituent, and the solvent-diluent mixture being selected from the group consisting of acetone, ethanol, isopropanol, butanol, toluene, and mixtures thereof. Arc welding with a consumable, low hydrogen type welding electrode occurs directly through the dried primer coat. The aluminum powder constituent serves as an effective deoxider for the steel and weld metal during welding operations.

---

This application is a continuation-in-part of my co-pending and now abandoned application Ser. No. 193,874, filed May 10, 1962, and entitled Steel Priming Composition and Method.

The present invention relates to the arts of cleaning, priming, storing and welding of steel plates and the like, and more particularly to primer compositions and techniques compatibly providing steel plates and the like having both good weatherability and good weldability characteristics, and also good receptivity with regard to final painting of the structures fabricated from the steel.

In the past it has been common practice in shipyards and other steel fabricating facilities to thoroughly clean steel plates and the like preparatory to fabrication, as by pickling and then applying a corrosion inhibitive primer coating, commonly termed "wash primers." The first successful wash primer, as disclosed in United States Patent No. 2,525,107, was developed for use in the marine field to prevent corrosion and undercutting of the primer film by rusts as well as providing a firm anchor for subsequent paint coats. Polyvinyl butyral conventionally forms the basis for such wash primers, which in addition are characterized by the presence of zinc or lead chromate and a phosphoric acid diluent.

For labor-saving reasons it is highly desirable that it be possible to rod weld directly through the primer coat rather than having to first remove it in the proposed weld area. Heretofore this has not been possible without increase in welding time or loss of weld quality, or without porosity in the weld metal, particularly when so called low hydrogen types of welding electrodes are used. As known, low hydrogen type electrodes are characterized by minimal moisture content so that as little water is presented to the weld melt as possible, to avoid the formation of disassociated or ionized hydrogen and thus minimize hydrogen embrittlement of the weldment.

Low hydrogen electrodes prevent underbead cracking due to hydrogen embrittlement, and because of the low penetrating arc, good bead shape, and high quality weld metal obtained with their lime type low moisture coating, they also tend to eliminate cracking in the weld deposit. Their use also eliminates the need for preheating in many cases where such would be required for satisfactory use of conventional electrodes such as American Welding Society EXX10 electrodes, and usually, higher welding speeds can be achieved. Generally speaking, the currents used with the low hydrogen electrodes are higher than those recommended for EXX10 electrodes of the same diameter.

The present invention aims to provide an improved process and primer whereby steel can be prepared for fabricating in a more expeditious manner and which will permit arc welding with both low hydrogen electrodes over a primer steel surface without loss of weld deposition, i.e. welding speed, or loss of weld quality, i.e. without inducing weld metal porosity.

As a further object, the invention aims to provide a superior steel primer having fast drying time, excellent bonding qualities, and providing a good adhesion surface for an usually wide range of paints and synthetic coatings.

It is a further object and advantage of the present invention to provide a weldable priming composition for steel plate and the like wherein the priming composition can be applied as a single coat, effectively up to coating thickness of at least about 2 mils, and provides effective corrosion resistance for extended periods of outdoor storage or salt spray exposure, in contrast to certain prior corrosion inhibiting primer compositions and procedures wherein two or more priming coats are necessary to develop comparable corrosion resistance.

It is a further object and advantage of the present invention to provide a primer composition for steel plate and the like, where the priming compoistion does not adversely affect the weldability of the steel and does not generate toxic fumes when a portion of the priming coat is burned by the welding operation.

Yet another object of the present invention is to provide a primer coat for steel plate and the like wherein the primer coat exhibits a substantial degree of flexibility under stress.

Yet another object and advantage of the present invention is to provide primer coating compositions which can be applied by spraying techniques directly to mechanically cleaned steel surfaces and which have effective drying times of about 3 to about 10 minutes under normal temperature and humidity conditions (20° C. and 25% relative humidity). As a related object and advantage, the present invention contemplates cleaning of steel stock and spraying of teh primer coat thereon as a continuous operation while the steel stock is being continuously conveyed through a particle blasting type cleaning equipment and adjoining spray booth.

In trades involving volume steel fabrication, such as shipyards, for example, many types of corrosion inhibiting compositions and techniques are known. It is a chronic problem and complaint in such trades that various coating compositions or techniques, although giving excellent results for certain purposes, have characteristics rendering them unsuitable for other purposes or for certain uses. Thus, certain primer compositions, although desirable from the point of view of weatherability, are not desirable or even usable in terms of other requirements or specifications. Considered collectively, various requirements or specifiactions for primer compositions for steel plate and the like include the following:

(a) Good adhesion to mechanically cleaned base surface,
(b) Easy to apply by spraying,
(c) Single coat adequate,
(d) Fast drying time,
(e) Good weatherability during outdoor storage, and good salt spray resistance,
(f) Proper light reflectivity for automatic plate cutting machine (e.g. Telerex), (g) Good flexibility under stress,
(h) No necessity to remove prior to welding,
(j) No reduction in welding speed as compared with unprimed stock,
(j) No macroporosity in weld metal when using low hydrogen type electrodes,
(k) Very little burn back of primer coat (e.g. ¼ to ⅜″),
(l) No blistering and good corrosion resistance in burn back area,
(m) Burn back easily removed by brushing prior to repriming,
(n) No toxic fumes generated during welding operation,
(o) Good compatibility with various coding pigments of the oxide type, in terms of no adverse effect or weldability, and
(p) Good compatibility of the primer with respect to direct application thereon of various types of final coats, notably alkyd, epoxy and various other synthetic resins.

A principle object and advantage of primer compositions of the present invention is that such primers can meet all of the above requirements or specifications, rather than only some of them, as is the case with prior wash primers used in the steel fabrication trades.

Other objects, advantages and features of the invention will appear from and be understood in the course of the following description of particular typical embodiments thereof, and the accompanying claims.

In certain primers according to the present invention, as in the case of the prior art wash primers, polyvinyl butyral resin can be employed as the principal coating constituent. It has also been found that such principal constituent can be an uncatalyzed resin or a hydrocarbon resin, or mixtures of any such resins.

The primer should be fast-drying for film application by spraying, and so I use the fast-drying lower molecular weight aliphatic alcohols and lower molecular weight aromtaic hydrocarbons as the solvent-diluent constituent of the primer. Good results are achieved by using acetone, ethanol or isopropanol with toluene at normal temperature, or butanol with toluene at particularly high atmospheric temperatures. Other combinations may be used, but in any case the diluent should have a faster evaporation rate than the solvent.

As known per se, polyvinyl butyral is made by the condensation of butyraldehyde and polyvinyl alcohol, and as usually commercially prepared, contains about 19% by weight of unreacted hydroxyl groups and a small percentage of acetate. These hydroxyl groups act as internal plasticizers and by their polar nature make the resin more adherent. In typical practice of the present invention, a polyvinyl butyral resin having a relatively low molecular weight is used to obtain a primer with a low viscosity suitable for spraying as a thin resin film in the order of from about one-half mil to about two mils thickness. "Butvar B-98," produced by the Shawinigan Resins Corporation, is a suitable such polyvinyl butyral resin, it having a molecular weight of 32,000 and a viscosity of 75 cps. (Ostwald viscosimeter) when 10% by weight of the resin is dissolved in a 95% ethanol solution. Its specific gravity is 1.1, and it has a polyvinyl alcohol content of 18 to 20% by weight and a maximum polyvinyl acetate content of 2.5%, leaving a polyvinyl butyral content of about 80%.

Basic to the primer of the present invention is the concept of using a metallic constituent immune to atmospheric degradation and having high electrical conductivity so that a coating of the primer will contribute only negligible electrical resistance for arc welding. I have found that aluminum powder serves well for such a pigment while at the same time contributing significantly as a corrosion inhibitor and deoxidier. However, rather than using polished leafing aluminum powder as is conventional in aluminum paints, I prefer to use a non-leafing low-grease unpolished aluminum powder with the polyvinyl butyral. This powder has given excellent results when a size having about a 325 mesh designation (90% through a 325 mesh), a specific gravity of 2.67, and a .045 gallon/lb. bulking value. Such a powder is available as "Alcoa Standard Unpolished Powder No. 606," produced by Aluminum Company of America. The aluminum powder to resin ratio by weight can vary from about 1:40 to about 1:1 and give the requisite electrical conductivity factor, with ratios of about 10:1 to about 5:1 being preferred.

*Example 1*

The following is an example of a suitable mixture (by weight) of resin, pigment, solvent and diluent for application of my invention in temperature ranges of from about 40° to 80° F.

| | Parts |
|---|---|
| Polyvinyl butyral (Butvar B-98) | 10 |
| Isoproply alcohol (99%) | 50 |
| Toluene | 39 |
| Aluminum powder (Alcoa No. 606) | 1 |

This primer, applied as a film about one-half mil in thickness over sandblasted mild steel, was extensively tested by arc welding with E7018 electrodes (low hydrogen) and found to be substantially as efficient in terms of inches of weld/sec. as the uncoated steel. Without the presence of the aluminum pigment the high dielectric value of the vinyl resin causes frequent breaking of the welding arc when attempted over a vinyl film.

*Example 2*

As a further example of practice of the present invention, a primer composition was prepared as follows.

| Constituent: | Amount, lbs. |
|---|---|
| Pre-polymerized, modified epoxy resin (such Araldite 488N40 marketed by Ciba Products Corporation) | 2.65 |
| Thermoplastic, highly aromatic, petroleum base hydrocarbon resin (such as Velsicol XL-30, marketed by Velsicol Corporation) | 0.45 |
| Leafing grade polished aluminum powder (65% suspension in toluene carrier, mesh size 95% less than 325 mesh) | 0.25 |
| Talc | 2.5 |
| Expanded clay thickening agent (Bentone 27, marketed by National Lead) | 0.1 |
| Solvent-diluent; 50% acetone–50% toluene, sufficient amount to provide one gallon total volume. | |

As is known, Velsicol XL-30 is a commercially available, thermoplastic, highly aromatic, petroleum base hydrocarbon resin, having a molecular weight range of about 800–1200, a softening point of 215°–225° F., a specific gravity at 60° F. of 1.05–1.07, and a maximum iodine value of 100.

The primer composition of Example 2, spray coated as a film about 1 mil in thickness over shot blasted steel plate and steel shapes, withstood U.S. Navy salt spray tests for over 200 hours and Weatherometer tests for periods in excess of 1000 hours. Outdoor weathering tests for a period of one year show no indication of failure.

Welding tests with respect to steel plate bearing the above primer coat, and using 7018 low hydrogen electrodes demonstrated that the primer coat can be welded through at the customary rate (i.e. about 12–20 feet per minute with non-primed stock), and no weld metal macroporosity was discerned in the formed welds. No toxic gases were released by primer coat combustion during the welding operations.

Other experimentation determined that the primer coats provided by the above examples are compatible with direct application thereover of alkyd, phenolic, epoxy, acrylic, chlorinated rubber, polyurethane, vinyl and vinyl alkyd paints, for example.

When color coding of the primed metal is desired, it has been found that various oxide type pigments can be added to the above primer compositions without any deleterious effect as for example by yellow, red, brown and green, from about 5 parts to about 20 parts of yellow, red or brown iron oxide, or green chromium oxide pigment.

Before applying the primer compositions thereto, the steel should be thoroughly cleaned of all mill scale, rust, grease, oils and other contaminants. Shot-blasting or sand-blasting has proven most effective for this purpose and is particularly advantageous if the equipment is placed in series with spraying equipment for the primer so that the metal may be continuously fed through both equipments and primer coated immediately after being cleaned. In this way the heat generated during the cleaning operation warms the steel and is utilized to help accelerate drying off the primer. With this arrangement the steel can be cleaned by shot-blasting and primed in a continuous operation in about 3–10 minutes after application and while the steel is moving at about 10 ft./min. and with a drying zone of only 30 to 100 ft. depending upon primer thickness. Then it can be transferred to either outdoor or indoor storage until needed or can be conveyed directly to the cutting and welding shops for immediate fabrication use.

My primer compositions are applied by single-coat spraying in a thin film of about 0.3 to 2 mils in thickness, with a thickness of about 0.3 to 0.7 mils being preferred. The aluminum powder constituent not only serves as an electrical conductor for the welding arc but also functions as a deoxidizer during the welding operation. Its immunity to atmospheric degradation makes it also valuable as a corrosive inhibitor. After the primed steel is welded and the weld areas cleaned as by wire brushing, the welds and surrounding areas are preferably spray coated with the primer.

The advantages of the invention, it is thought, will have been clearly understood from the foregoing detailed description. Various changes and modifications will suggest themselves and may be resorted to without departing from the invention, within the scope of the following claims.

What is claimed is:

1. The process of preserving the mechanically cleaned surfaces of and subsequently arc welding steel plate and the like, comprising:
   (a) cleaning the surfaces of the steel by particle-blasting;
   (b) immediately spraying a fast-drying primer coating on the steel surfaces immediately subsequent to the cleaning thereof, such primer coating composition as applied at least principally comprises:
      (1) as a resin constituent, a resinous material selected from the group consisting of polyvinyl butyral resin, uncatalyzed epoxy resin, hydrocarbon resin, and mixtures thereof,
      (2) as a pigment, corrosion inhibitor, electrical conductor and deoxidizer, aluminum powder having a particle size at least predominantly less than about 325 mesh, and being present in a ratio of from about 1:40 to about 1:1 by weight relative to the resin constituent, and
      (3) as a fast drying solvent-diluent, a hydrocarbon vehicle selected from the group consisting of acetone, ethanol, isopropanol, butanol, toluene, and mixtures thereof;
   (c) air drying the primer coat; and
   (d) fabricating a steel article from the steel by rod welding, forming weld fillets in the article by fusion of a consumable, low hydrogen type welding electrode and without prior removal of the primer coating, the aluminum powder content of the primer coating serving as an effective deoxidizer for the steel and weld metal during the welding operation.

2. The process of claim 1, further comprising coating the surface of weld metal and adjacent areas of the steel article with such primer coating composition subsequent to fabrication of the article.

3. The process of claim 1, wherein said resin constituent is polyvinyl butyral resin.

4. The process of claim 1, wherein said resin constituent is a mixture of uncatalyzed epoxy resin and hydrocarbon resin.

5. The process of claim 1, wherein said aluminum powder is of the non-leafing, low-grease, unpolished type.

6. The process of claim 1, wherein said aluminum powder is of the leafing type.

7. The process of claim 1, wherein the aluminum powder and resin are respectively present in a ratio of from about 1:10 to 1:5.

8. The process of claim 1, wherein the primer composition is applied to a thickness of less than about 1 mil.

9. The process of claim 1, wherein the primer composition is applied to a thickness of about 0.3 to about 0.7 mil.

10. The process of claim 1, wherein said solvent-diluent is a mixture of isopropanol and toluene in approximately equal proportions.

11. The process of claim 1, wherein said solvent-diluent is a mixture of acetone and toluene in approximately equal proportions.

12. The process of claim 1, wherein the drying time of the primer coat is from about three to about ten minutes.

13. The process of claim 1, further comprising, as a coloring constituent, a pigment selected from the group consisting essentially of iron oxide and chromium oxide powders.

14. A steel structure fabricated by arc welding of steel plate and the like and comprising preliminarily mechanically cleaned surfaces coated with a primer coat, said surfaces being interspersed by weld fillets formed by fusion of a consumable, low hydrogen type welding electrode, without removal of the primer coating from the adjacent steel surfaces, said weld fillets being characterized by the absence of macroporosity, the said primer coat at least principally comprises:
   (a) as a resin constituent, a resinous material selected from the group consisting of polyvinyl butyral resin, uncatalyzed epoxy resin, hydrocarbon resin, and mixtures thereof;
   (b) as a pigment, corrosion inhibitor, electrical conductor and deoxidizer, aluminum powder having a particle size at least predominantly less than about 325 mesh, and being present in a ratio of about 1:40 to about 1:1 by weight relative to the resin constituent.

15. The steel structure of claim 14, wherein said primer coat additionally comprises a coloring constituent selected from the group consisting of iron oxide and chromium oxide powders.

References Cited

UNITED STATES PATENTS

| | | | |
|---|---|---|---|
| 1,108,592 | 8/1914 | Lincoln | 219—137 |
| 2,525,107 | 10/1950 | Whiting et al. | 148—6.16 |
| 2,762,308 | 12/1955 | Cinamon | 219—92 |
| 2,875,087 | 2/1959 | Crandon | 117—160 |
| 2,878,141 | 3/1959 | Canniff | 117—160 X |
| 2,881,091 | 4/1959 | Schulze | 117—71 |
| 2,941,894 | 6/1960 | McAdow. | |
| 2,996,709 | 8/1961 | Pratt | 117—131 |

JOSEPH V. TRUHE, *Primary Examiner.*